United States Patent
Khabiri et al.

(10) Patent No.: US 11,531,858 B2
(45) Date of Patent: Dec. 20, 2022

(54) COGNITIVE CONVERSATIONAL AGENT FOR PROVIDING PERSONALIZED INSIGHTS ON-THE-FLY

(71) Applicant: International Business Machines Corporation, Armonk, NY (US)

(72) Inventors: Elham Khabiri, Briarcliff Manor, NY (US); Pietro Mazzoleni, New York, NY (US); Lei Kuang, Ramsey, NJ (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 15/860,047

(22) Filed: Jan. 2, 2018

(65) Prior Publication Data

US 2019/0205726 A1  Jul. 4, 2019

(51) Int. Cl.
*G06F 16/2452* (2019.01)
*G06F 16/242* (2019.01)
*G06N 3/00* (2006.01)

(52) U.S. Cl.
CPC ........... *G06N 3/006* (2013.01); *G06F 16/243* (2019.01); *G06F 16/2425* (2019.01); *G06F 16/24522* (2019.01)

(58) Field of Classification Search
CPC ............................ G06F 16/243; G06F 16/2425
(Continued)

(56) References Cited

U.S. PATENT DOCUMENTS 7,716,174 B2  5/2010 Lee et al.
8,280,900 B2  10/2012 Pickens et al.
(Continued)

FOREIGN PATENT DOCUMENTS

CN  101872349 B  6/2013
CN  105068661 B  9/2018

OTHER PUBLICATIONS

Heilman et al., "Good Question! Statistical Ranking for Question Generation", Proceedings of the Conference of the North American Chapter of the Association for Computational Linguistics: Human Language Technologies, Jun. 2010, pp. 609-617; http://repository.cmu.edu/cgi/viewcontent.cgi?article=1228&context=lti.
(Continued)

*Primary Examiner* — Kimberly L Wilson
(74) *Attorney, Agent, or Firm* — Scully, Scott, Murphy & Presser, P.C.; Samuel A. Waldbaum

(57) ABSTRACT

A system, method and computer program product, which given in input a question in natural language format, delivers personalized insights related to the answer. Personalized insights are selected among candidate insights mined from the data and ranked based on closeness to (mined) user-preference, relevance to the question, and surprise factor. Two core components include: Question analysis and meaningful insight look up and Multi-dimensional insight ranking. The Question analysis and meaningful insights lookup module performs a semantic analysis of the questions and, uses techniques including "templates" to build new questions which could uncover insights from the data. The Multi-dimensional insight ranking module takes in input a list of insights returned from Question analysis and meaningful insights lookup and rank such insights based on such factors as: relevance to the query, surprise factor, and user preferences.

20 Claims, 10 Drawing Sheets

(58) Field of Classification Search
USPC .......................................................... 707/797
See application file for complete search history.

(56) References Cited

U.S. PATENT DOCUMENTS

| | | | |
|---|---|---|---|
| 9,336,302 | B1 | 5/2016 | Swamy |
| 9,521,252 | B2 | 12/2016 | Leeds et al. |
| 2009/0287678 | A1 | 11/2009 | Brown et al. |
| 2011/0125764 | A1 | 5/2011 | Carmel et al. |
| 2011/0320381 | A1 | 12/2011 | Srivastava et al. |
| 2012/0284080 | A1 | 11/2012 | De Oliveira et al. |
| 2014/0222743 | A1 | 8/2014 | Baughman et al. |
| 2016/0196313 | A1* | 7/2016 | Allen .................. G06F 16/3329 707/723 |
| 2016/0343371 | A1 | 11/2016 | Sharifi et al. |

OTHER PUBLICATIONS

Agarwal et al., "Automatic Question Generation using Discourse Cues", Proceedings of the Sixth Workshop on Innovative Use of NLP for Building Educational Applications, Portland, Oregon, Jun. 2011, pp. 1-9; http://wing.comp.nus.edu.sg/~antho/W/W11/W11-14.pdf#page=13.

Curto et al., "Exploring linguistically-rich patterns for question generation", Proceedings of the UCNLG+Eval: Language Generation and Evaluation Workshop, Edinburgh, Scotland, UK, Jul. 31, 2011; pp. 33-38; http://www.aclweb.org/anthology/W/W11/W11-27.pdf#page=43.

* cited by examiner

US 11,531,858 B2

COGNITIVE CONVERSATIONAL AGENT FOR PROVIDING PERSONALIZED INSIGHTS ON-THE-FLY

FIELD

Embodiments of the present invention generally relate to computers, and computer applications, and more particularly to computer-implemented system and method for enhancing a display presentation with additional insight data for a question/answer system.

BACKGROUND

Business users require access to multiple tools, platforms, and dashboards to analyze data and extract insights meaningful for their work.

As an example, marketers and marketing professionals have to access, among others, web analytics (e.g., Google Analytics), advertisement campaign data (e.g. DoubleClick or IBM marketing Cloud), and sales data (e.g. Salesforce) to analyze and optimize marketing performance. However, more often than not, such data are not integrated or easy to access by a non-technical person. Analyses are then delegated to data-scientists of people with specific technical background slowing down the ability of a person to take quick actions on data.

Historically, there have been multiple efforts towards integrating all various data into a single "tool" and offer a user friendly dashboard or like visualization tool for business users. More recently, natural language interfaces have been proposed to relieve business users from browsing a complex interface. In this context, solutions like "Watson Analytics" go one step forward guiding business users on data exploration with questions and answers based on their data.

SUMMARY

An advisory system, method and computer program product is provided that assists business users (e.g. marketers) to navigate through complex data by intelligently guiding them throughout meaningful data-driven insights.

The system takes as input a question in the form of a natural language (NL) format and, along with the answer (extracted from data), it delivers related insights personalized to the users. Related insights help a user either to further contextualize the answer or to guide user towards related information which are personalized to user preferences and analyses performed on the data.

According to one aspect of the present invention, there is provided a computer-implemented method for supplementing insights from data in a question/answer system. The method comprises: receiving, at a hardware processor, via a user input interface, a question in a natural language format; identifying, using the hardware processor, entities in the received NL question; initiating, using the hardware processor, a query processor to conduct a first search of a data resource to obtain an answer to the received NL question; generating, using the hardware processor, multiple candidate expanded questions based on the identified entities and the obtained answer; initiating, using the hardware processor, the query processor to conduct a second search at the resource to obtain corresponding answers to the multiple candidate questions; selecting, using the hardware processor, a sub-set of candidate questions and corresponding answers from among the candidate expanded questions based upon one or more criteria; and presenting to the user, via the user interface, additional personal insight data related to the answer of the received original question based upon the selected sub-set of corresponding answers.

In another aspect of the present invention, there is provided a computer-implemented advisory system. The advisory system includes: a memory storage device; and a hardware processor coupled to the memory storage device and configured to perform a method to: receive, via a user input interface, a question in a natural language format; identify entities in the received NL question; initiate a query processor to conduct a first search of a data resource to obtain an answer to the received NL question; generate multiple candidate expanded questions based on identified entities and obtained answer; initiate the query processor to conduct a second search at the resource to obtain corresponding answers to the multiple candidate questions; select a sub-set of candidate questions and corresponding answers from among the candidate expanded questions based upon one or more criteria; and present to the user, via the user interface, additional personal insight data related to the answer of the received original question based upon the selected sub-set of corresponding answers.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In one aspect, a system and method are provided to leverage a cognitive conversational "agent" or tool for providing personalized insights for users "on-the-fly", i.e., in-real-time or near-real-time, via a user interface device.

There is further provided a computer-implemented advisory system which helps users (e.g., marketers) to navigate through complex data by intelligently guiding them throughout meaningful data-driven insights.

Figure 2:
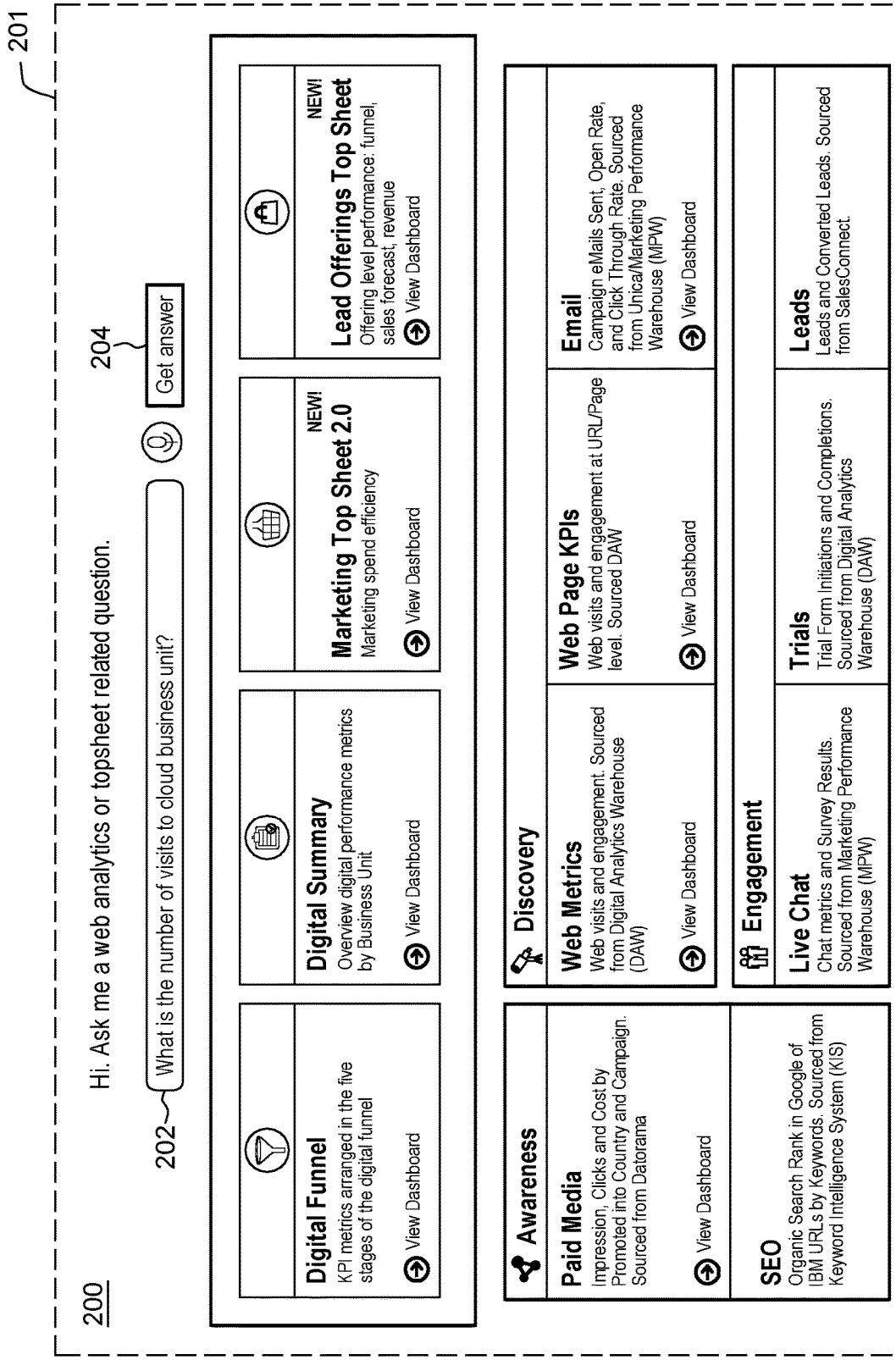
FIG. 2 depicts an example dashboard generated on a computer interface display via which a user can enter, retrieve and/or view answers to questions and additional insights.

FIG. 2 shows an example user interface in the form of a business intelligence dashboard 200, generated on a computer screen display interface 201 via which a user can enter, retrieve and/or view data stored, for example, in a relational database. For example, the business dashboard 200 generated for display via a computer interface may generate displays to obtain analytics such as key performance indicator metrics, overviews of digital performance metrics according to business units, e.g., of an enterprise, marketing tools, discovery, e-mail and chat tools etc., as known in the art. There is a further provided an input entry field 202 via which a user may input a question as text in a natural language (NL) format. By selecting the "Get answer" button 204, the user initiates operation of the computer system's business analytics for generating an answer to the input question from stored business data and intelligence associated with the enterprise as known in the art.

Figure 1:
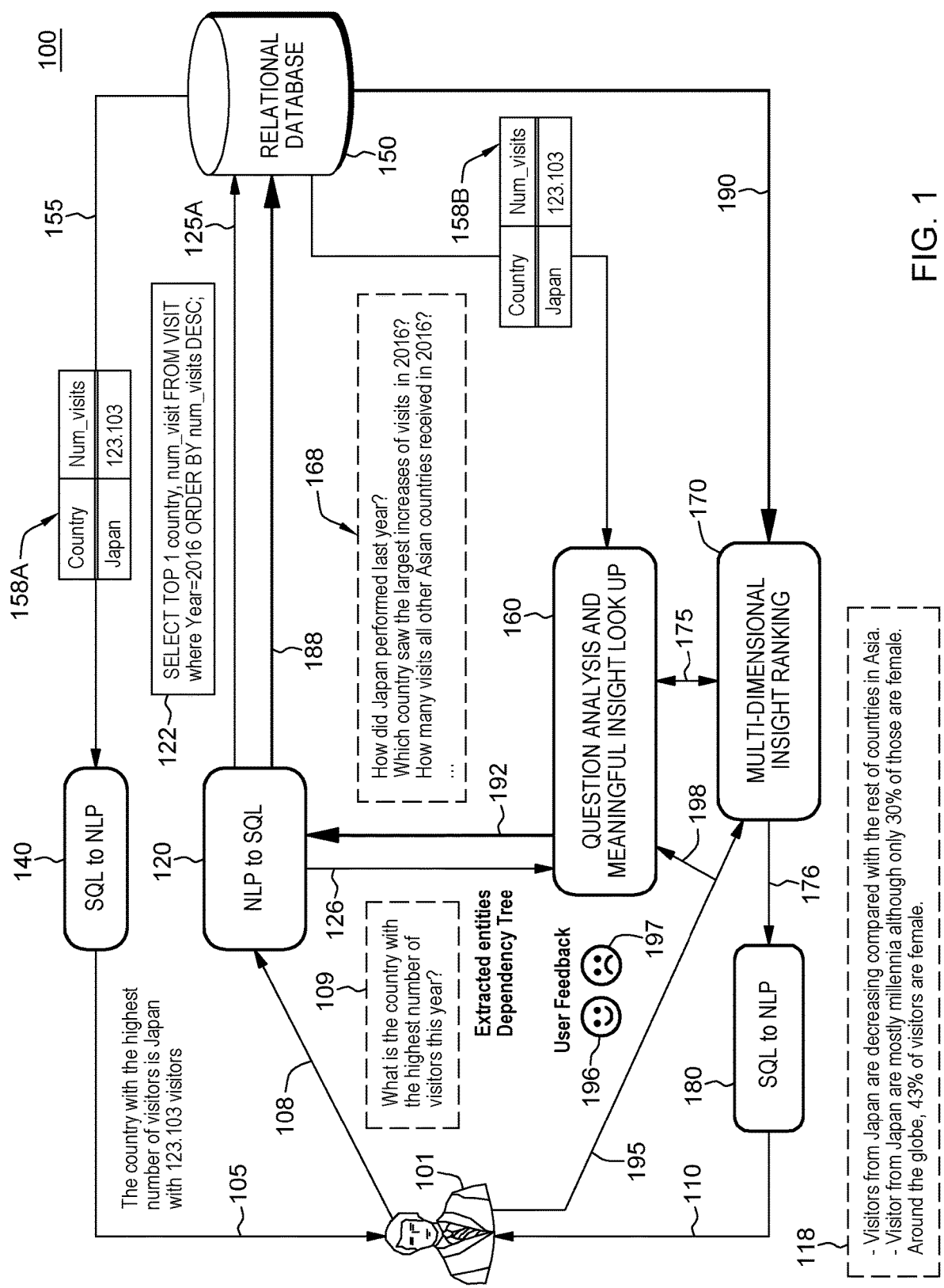
FIG. 1 depicts a computer-implemented system for receiving question inputs from users and generating an output presenting answers in addition to related insights personalized to the user.

FIG. 1 shows a computer-implemented system 100 for receiving question inputs from users 101 and generating an output presenting answers 105 to the received question in addition to enhanced display portions including related insights 110 data personalized to the users.

In one embodiment, in FIG. 1, there is shown the receipt of question 108 via the interface of FIG. 2 at a converter module 120 including a query processor that invokes natural language processing (NLP) techniques to convert the textual question into Structured Query Language (SQL) formatted query statements 125A used for managing/accessing data held in a relational database management system (RDBMS) 150. As known in the art, a generic query processor (not shown) invokes an SQL process and RDBMS cooperatively function to generate queries and extract data from the database and generate an answer 155, e.g., in an SQL format. The SQL data-formatted answer is received at a converter module 140 that invokes techniques for converting the SQL formatted answer into a textual answer 105 for display back to the user via a display interface. However, at the same time, there are additional modules invoked that perform additional processes to provide related insights 110 personalized to the user.

FIG. 1 shows an additional Question Analysis module 160 that receives entities extracted from the input query or question. In one embodiment, from the input query statement(s) 108, the NLP to SQL converter module 120 generates a dependency tree structure, e.g., a directed graph representing dependencies of several objects towards each other, and performs an entity extraction procedure to extract entities 126 from the dependency graph and provides them as input to the Question analysis and meaningful insight lookup module 160. In conjunction with operations performed at the Multi-dimensional insight ranking module 170, the meaningful insight module 160 performs further analysis for generating related insights data 175 personalized to the users in the SQL format. These structured related insights data 175 are ranked to generate a most relevant order of related SQL insight information 176 which is/are received at an SQL to NLP module 180 that converts the SQL formatted data 175 into textual related insights data 110 for delivery and/or presentation to the user 101 via the display interface 200. The related insights 110 helps a user either to further contextualize the answer or to guide user towards related information which are personalized to user preference and analysis done on the data.

Thus, as a non-limiting example, a user 101 inputs an example NL question 109 via the dashboard entry field such as "What is the country with the highest number of visitors this year?". NPL to SQL module 120 then implements NL sentence processing, including extracting entities from a dependency graph of the input and using a query processor for generating a corresponding SQL statement 122.

Figure 3:
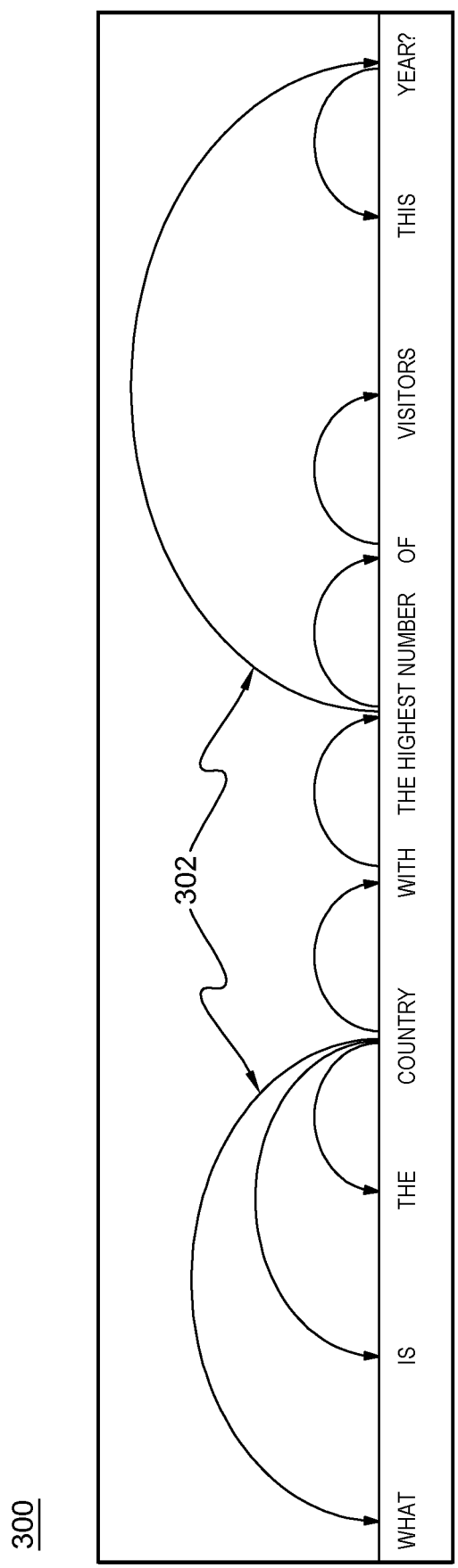
FIG. 3 depicts an example dependency graph that may be generated for identifying entities within an input question that can be used to obtain further insights.

FIG. 3 depicts an example dependency graph 300 that may be generated for identifying entities within an input question that can be used to obtain further insights. For example, the NLP to SQL module 120 may invoke a natural language parsing tool that receives the example input NL question 109 "What is the country with the highest number of visitors this year?" of FIG. 1 and generates data dependencies based on data types (constraints). The module 120 analyzes the grammatical structure of the input question 109, and establishes relationships between "head" words and words which modify those heads to result in the formation of a dependency graph 300. As shown in FIG. 3, graph 300 may be constructed by generating edges or arcs 302 that connect dependent entities and also specify a type of the relationship between the head and dependent entities (words) being described. For the example question 109, identified entities that may be extracted would include a "number of visitors," "country" and "this year." From the extracted entities, there are identified concepts of the input question.

After the NL processing, the query processor of module 120 generates a corresponding SQL statement 122 which accesses the relational database and generates an answer 158A including the name of the country (e.g., Japan) and the number of visitors (e.g., 123,103). The Question Analysis and meaningful insight look-up block 160 receives the same answer 158B which is further processed with the question to extract meaningful insights. For example, as will be described in greater detail below, based on the generated dependency graph associated with the question 108, and given answer 158B, the Question Analysis and meaningful insight look-up block 160 invokes the query processor to perform procedures to generate related questions 168 which related questions are input to the NLP to SQL block 120 in order to generate further SQL statements 188 corresponding to the related questions. The generated further SQL statements 188 are processed at the RDBMS 150 and additional meaningful insights SQL statements data 190 is extracted. The additional insights data are ranked at module 170 and the most relevant related insights data SQL statements 175 are converted by SQL to NLP converter 180 into the most meaningful insights data 110 for presentation to the user 101 with the generated answer 105 to the original input question. A non-limiting example of most relevant related insights data 118 based on the original input question may be statements such as "visitors from Japan are decreasing compared with the rest of countries in Asia" and "visitors from Japan are mostly millennia although only 30% of those are female. Around the globe, 43% of visitors are female."

In a further embodiment, as shown in FIG. 1, the user 101 may provide feedback into the system, e.g., into multi-dimensional insight ranking block 170, to refine the models used to extract meaningful insight for that (or other) user(s). Such feedback may include whether the extracted meaningful insight data presented to the user was meaningful, and may input a degree of importance or helpfulness, that can be used for further related searches by that user or other users. Additionally, the user 101 may provide feedback directly into the question analysis and meaningful insight look up module 160 for use in identifying which candidate expanded query to create.

Figure 4:
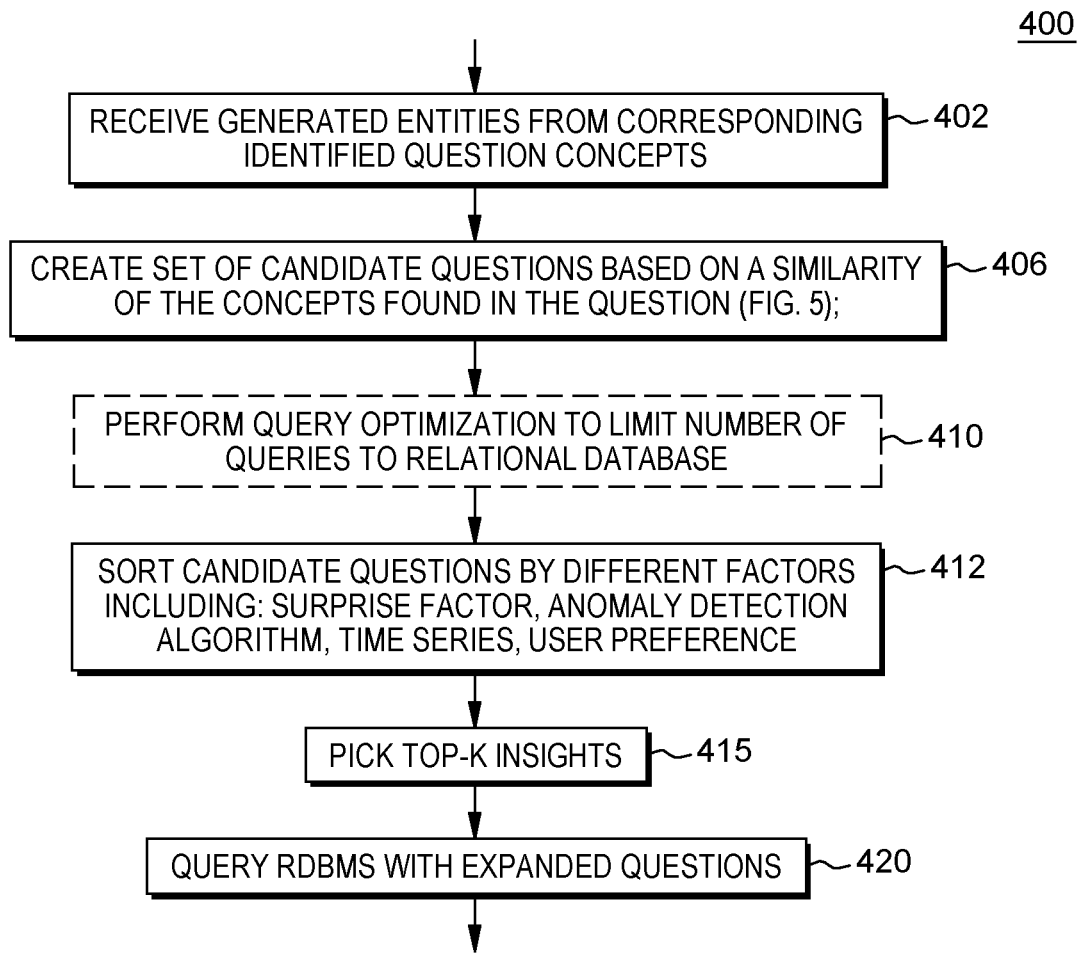
FIG. 4 depicts a flow chart of a method implemented at question analysis and meaningful insight look-up module in the system of FIG. 1.

FIG. 4 depicts a flow chart of a method 400 implemented at question analysis and meaningful insight look-up module 160 of FIG. 1. At 402, the question analysis and meaningful insight look-up module 160 automatically receives the extracted entities (i.e., identified question concepts) 126 from the generated dependency graph corresponding to the received user question and expands the question for generating additional questions for discovering additional insights from the data. Optimization techniques are used to limit the number of data-lookup needed from the data. Further, candidate expanded queries may be created based on received user feedback. For example, received feedback from a user(s) may indicate types of expanded query or queries that would provide useful insight data. This feedback would be used in the creating of the candidate questions.

Then at 406, module 160 creates a set of candidate questions based on similarity of the concepts found in the question and/or user feedback. In particular, the module 160 searches for related questions to the original received input question and invokes query processing to generate multiple related questions. In one embodiment, the method employs question expansion templates that are applied to the identified question concepts to generate further related questions. Further, the meaningful insight look-up module 160 may use the same output data, e.g., answers 158B, from the original question as an input to extract meaningful insights. In one embodiment, the multi-dimensional insight ranking module 170 will limit the number of related questions to a top-k amount which will be the most relevant based on the user needs.

As further shown in the method of FIG. 4, after creating a set of candidate expansion questions based on applied question expansion templates based on the concepts found in the input question, the method proceeds to 410 to optionally or in addition, at a time of generating candidate expansion queries, perform a semantic query optimization analysis in order to consolidate and limit the number of expanded candidate questions. Then, at 412, the method performs multi-dimensional insight ranking by sorting the candidate expansion questions by different factors. In one embodiment, the multi-dimensional insight ranking module 170 sorts the candidate questions 175 in order of importance by factors including one or more of: a Surprise Factor, an Anomaly Detection Algorithm, a Time Series, and a User Preference. In one embodiment, each of these factors is used to generate a score for the candidate expansion question, and a ranking is performed to generate a list of the candidate expansion questions, e.g., from a highest score to lowest score. In a further embodiment, the output data obtained from the original question may be used as input for the ranking. Then, at 415, FIG. 4, top-K number of candidate expansion questions having the highest scores may be selected, and at 420, corresponding top SQL queries are generated as shown at 192, FIG. 1, for receipt at the RDBMS 150 for obtaining additional insight data most relevant to the user for presentation to the user.

Figure 5:
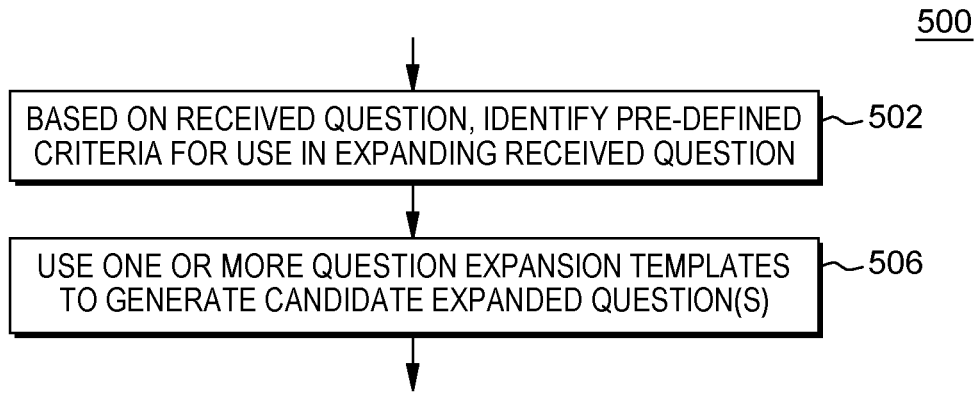
FIG. 5 shows a method of applying the criteria for expanding the original received questions to generate additional insights data in one embodiment.

FIG. 5 shows a method 500 of applying the criteria for expanding the original received questions at step 406, FIG. 4, to generate additional insights data. For example, at 502, FIG. 5, the module 160 identifies pre-defined criteria to expand the original question. At 506, the pre-defined criteria may be embodied in the form of one or more question expansion templates that may be applied to generate additional candidate questions related to the original input question. In an example embodiment, question expansion templates that may be applied include one or more of: a Time-based template; a Content-hierarchy-based template; a User Preference-based template; an Entity Similarity-based template; an External news based template; or use of a Machine learning model.

As an example, a Time-based template may be applied to expand the time scope of the original question, e.g., to identify a trend in the last time period or another time period. For example, the original question included a concept relating to "last year", however, by applying time-based template, the temporal basis may be expanded or reduced, i.e., by changing the time scope, e.g., last month, last quarter, or last 2 years, etc.

As a further example, a Content-hierarchy-based template may be applied to expand the content scope. For example, an original input NL question may be: "What is the number of user visits to the cloud business unit (BU) received last week?" The Content-hierarchy-based template may be used to generate related questions pertaining to other departments in a hierarchical structure, e.g., within an analytics business unit, or a social cloud unit department within or separate from the BU, or business units in other countries. By additional application of the first time-based template, the generated questions may be a modification that changes the time scope to find the number of user visits to the social cloud unit department within the last month or last quarter.

As a further example, the User Preference-based template may be applied to expand the question scope. For example, the User Preference-based template may be a criteria relating to Public preferences or User preferences initially known beforehand. In one embodiment, a "user preference" may include, but is not limited to: a job role, historical interactions, a time of the day and device used to query the system, and behavior of like people.

In one embodiment, pre-defined public preferences may be used to address a cold-start problem, e.g., a received input question of first impression. For example, the Public or User preferences criteria may be a specific country, and/or a time frame/period basis known beforehand as important to the user, e.g., a monthly or quarterly time scope as opposed to weekly basis is more important. Another example may be that for any received question relating to a business unit department x, it is automatically known that the specific department y is close and that the user preference is such that the user would need to know more information about department y. For example, User Preferences may be based on the history of the user's interaction with the system, previous questions that have been entered or expanded, or based on a user profile, etc. For example, it may be that the particular user always wants to know about a specific business (e.g., cloud business unit) in a specific geography, e.g., Asia. The system learns from the user's history and interactions with the system to learn what is important to the user. Similarly, the system may learn from history of multiple users that use the system (i.e., public) preferences. Thus, the user or public preferences criteria may be applied based on what the system knows is important to the requesting user(s).

In one embodiment, a recursive machine learning (not shown) algorithm may be employed in system 100 for use as a prediction tool to generate a new related question that is most relevant given the user's history of questions that the user (or multiple users) has asked. For example, based on the user's prior history of interactions it may be learned that a user has prior asked a question about a concept A, and at another time, asked a question about concept B. Via this history, it may be predicted that based on these two previous questions, a related question that may be asked may relate to a concept C as a predicted most relevant question.

In a further embodiment, the Entity Similarity-based template may be applied to expand the question scope. For example, given that a user, in the example embodiment, has asked a question about a total number of visits, then a very related entity may be a number of click-throughs, and a new semantic similarity-based question would be generated to give additional insight as to this related entity. Similarly, for a question relating to an entity of revenue, a similarity-based entity may be related to profit and an expanded question may be generated to obtain this additional insight.

In a further embodiment, the External news based template may be applied to expand the question scope. For example, it may be that there is a social media trend or current news worthy item that has recently received increased coverage and presence in the news, e.g., about cloud usage. Thus, for a received question having an entity indicating a business's analytics department, then the received question may be expanded based on an entity (or entities) currently famous in the social media or the news, e.g., expanded query about that business's cloud use.

In a further embodiment, a Machine learning model may be implemented for use in expanding the question to obtain additional relevant insight. The particular learning model may associate rules mining, e.g., by identifying two correlated variables towards a given objective. For example, this model may be employed to exploit that certain entities are always known to relate to other entities which may be provided as insight to the user.

Figure 6:
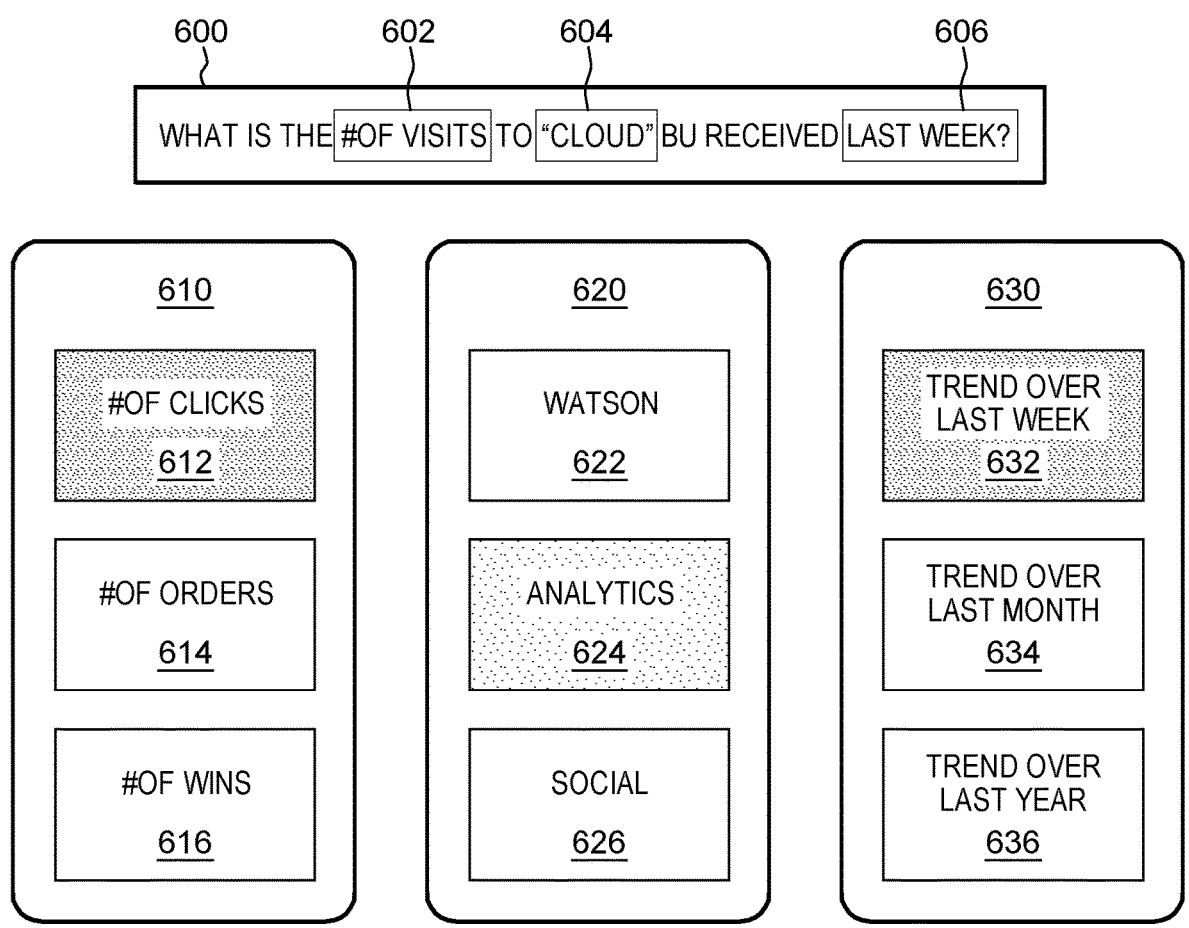
FIG. 6 depicts an example application of one or more question templates for generating additional candidate expanded questions based on a received original question.

FIG. 6 depicts an example application of one or more question templates for generating additional candidate expanded questions based on a received original question 600. For example, given a received question "What is the # of Visits to "Cloud" BU received last week?", then based on semantic similarity of the concepts found in the question, there is generated additional candidate questions for use in obtaining additional relevant insight data. Thus, using the NL parser and the dependency tree structure generated therefrom, there may be identified question concepts such as number of visits 602, cloud 604, and last week 606. The application of entity semantic similarity-based template 610 may be used to identify additional entities for question concept 602. For example, the entity similarity-based template 610 may generate new candidate questions relating to a new number of clicks entity 612, a new number of orders entity 614 and a new number of wins entity 616. In this example, it may be know from user preferences that the number of clicks entity 612 is very relevant for the user's purpose, e.g., based on a criteria. Similarly, application of content hierarchy-based template 620 to the identified cloud business unit concept 604 may be used to identify additional entities and generate new candidate questions relating to a new entity Watson artificial intelligence platform 622, a new analytics BU entity 624 and a social media BU entity 626. In this example, it may be know from user/public preferences that the analytics entity 624 may be very relevant for the user's purpose, e.g., based on a criteria. Further, in this example, application of time-based question template 630 to the identified last week time concept 606 may be used to identify additional entities and generate new candidate questions relating to a new entity such as a trend over last week concept 632, a trend over last month concept 634 and a trend over last year concept 636. In this example, it may be known from user/public preferences that the trend over last week entity 632 may be very relevant for the user's purpose, e.g., based on a criteria.

To arrive at particular candidate concepts 612, 624 and 632 as being most relevant, there may be implemented a criterion, such as by invoking a model that knows which concepts are more similar to each other or further away from each other. One such example model is "Word2Vec" model that understands semantic similarity of the entities. Such a model employs an algorithm that can generate vector representations of the entities/concepts and determine by distances between vectors, which particular concepts are closer to each other, and hence most relevant, and which are further apart or not relevant. In the example shown in FIG. 6, thus a most relevant candidate question for generating related insights data may be "What is the number of click to Analytics over the last week?".

Returning to FIG. 4 at step 410, the method may optionally or in addition, at a time of generating candidate expansion queries, perform a semantic query optimization analysis in order to consolidate and limit the number of queries.

Additional techniques, including but not limited to "semantic query optimization" (SQO), may be used to determined the most efficient way to execute a given query by considering the possible query plans.

As one example, query optimization at 410 may include consolidating queries having a similar template. For example, from use of the time-based template, rather than generate a candidate question relating to a business unit (BU) for each time period, e.g., week, month, quarter, the generated query may specify only one time period, e.g., a year, in order to input just one question that covers the other time periods (e.g., week, month time periods) as a result of applying the template. Thus, queries for each of the time periods is avoided or limited. Rather, at step 410, FIG. 4, a single general query 192 for the RDBMS may be generated requesting data for a larger time period, and the results from the RDBMS are stored locally, e.g., in a local memory associated with the user's computing system (not shown). FIG. 1 depicts the generation of a single optimized query 192 for the RDBMS 150 to provide results for localized storage. The data returned based on the single query may be stored in a localized memory, and if necessary, based on the results returned, local computations may be subsequently performed to compute the query results for each of the other time periods (e.g., weekly, monthly, etc.) from the locally stored data. Further to query optimization, the method may drop queries that historically were not selected as part of insights ranking. In this embodiment, novel caching mechanisms may be employed to store the data received from the RDBMS covering the other different time periods, and likewise to store data consolidated for each of the templates. Thus, if it is determined that a certain time period (e.g., monthly) may be more relevant that another, the locally stored data (e.g., results data for a year obtained for a single query) may be obtained from the local stored data.

In a further embodiment, the user may initially specify a limit to the number of candidate questions/concepts. For example, a parameter "n" may be the top 10 or top 100 insights and thus, the system will limit the number of generated candidate questions based on the parameter.

As mentioned, in one embodiment, at 412, FIG. 4, a score is generated for each candidate expansion question and returned data based on multiple factors, including but not limited to: 1) Surprise factor, e.g., what will be the most surprising yet relevant fact for the person asking the question; 2) Anomaly detection algorithms, e.g., what are considered to be anomaly among the existing trends; 3) Time series, e.g., what is the most relevant time series period to frame our insight, based on given query; 4) User preferences: a predictive model of what the user is most likely to consume (e.g., based on wisdom of the "crowd", historical user behavior, and/or that user's profile and interest); and 5) Semantic similarity, e.g., a measure of closeness between the question asked by the user and the one automatically generated by the question analysis and meaningful insight lookup module.

Figure 7:
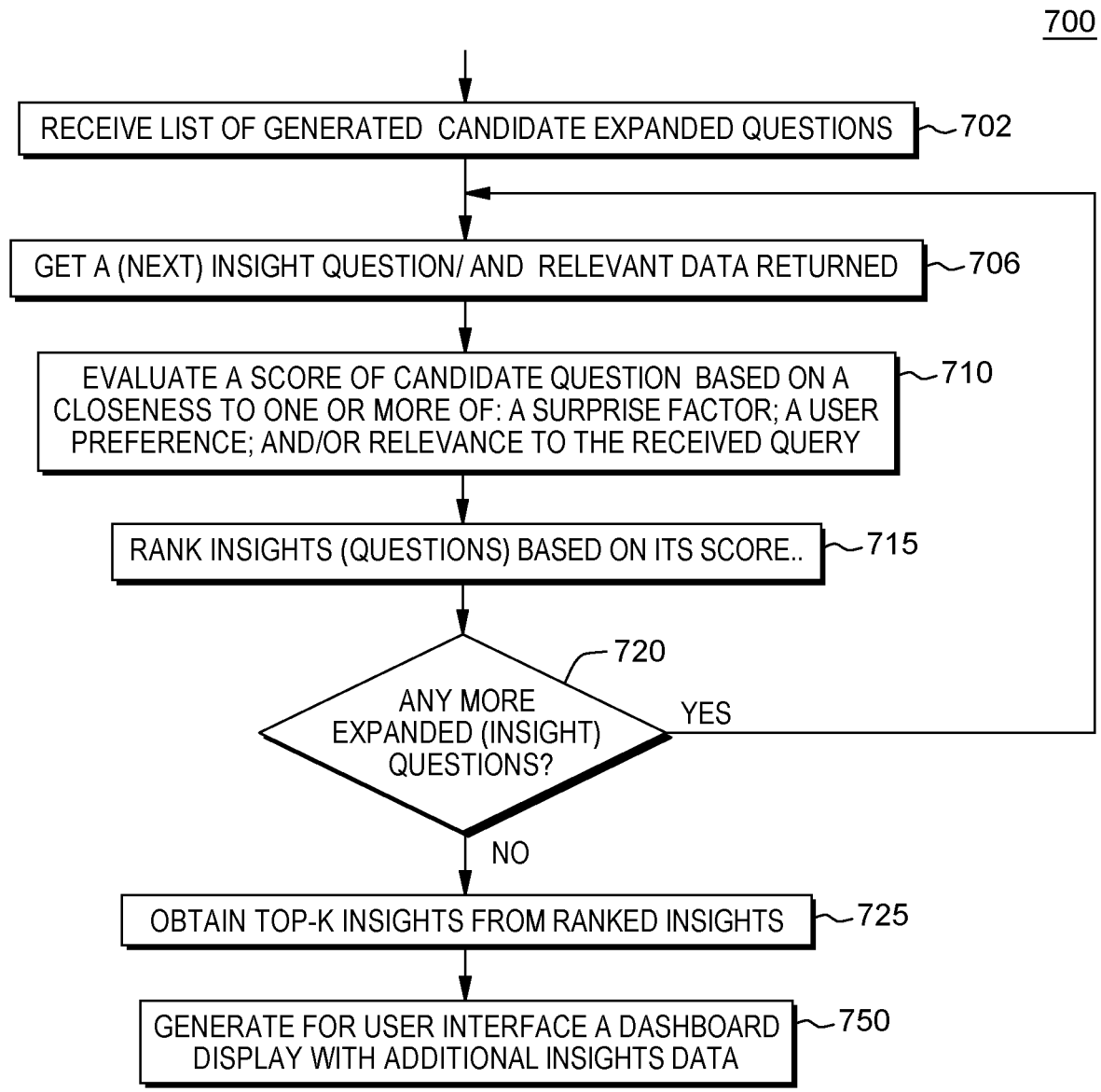
FIG. 7 depicts a method employed by the multi-dimensional insight ranking module to generate scores and sort the candidate questions.

FIG. 7 depicts a method 700 employed by the multi-dimensional insight ranking module 170 to generate scores and sort the candidate questions 175 in order of importance by the aforementioned: Surprise Factor, an Anomaly Detection Algorithm, a Time Series, and a User Preference criterion. In one embodiment, at 702, the module receives candidate expanded questions/and based on applied question expansion templates and the concepts found in the initial input question. At 706, an expanded candidate question is received and based on its returned data, at 710, each of these factors is used to generate a score for the candidate expansion question. That is, for evaluating and determining a candidate question's score, use is made of the data 190 obtained from the relational database 150 that has been stored or cached locally. In one embodiment, at 710, the method valuates a score of the candidate question based on a closeness to one or more of: a Surprise factor; a user preference; and/or relevance to the received query. For an example evaluation based on a surprise factor, for the example question (total number of visits in Japan last year), it may be determined from the data that last year, Japan had performed the worst as compared to the rest of the countries in Asia which may be a surprising factor.

As an example of evaluating a score to a candidate question based on an anomaly, the obtained data may indicate a trend over the last several years as a number of click-throughs for cloud as always increasing, yet last year the number of click-throughs was constant which may be determined as an anomaly. Another example would be the opposite: the data indicating a decreasing trend of click-throughs over past succeeding years yet, in the current year there is an increase of click-throughs. An anomaly detection algorithm may be used to determine this anomaly. For an example, the time series evaluation, a most relevant time series period is used to frame an insight, based on a given query. For example, if the queries have been directed to determine a trend for a time period of a month, more weight may be attributable to determine data for the last week given its proximity to a month (preference has been for short time rather than long time preference). Similarly, if recent queries are directed to week interval, additional insight may be given for a similar data query for a month's time (rather than a quarter or yearly time period) so the weight (score) would be higher for the candidate question directed to the month time period. With respect to user preferences criteria, user queries relating to "clouds" would more likely be interested in "analytics" (e.g., based on multiple users) and more weight would be attributable to a query relating to "analytics" rather than a question relating to "social", for example. Here a predictive model is generated for a cohort of users such that interests (of the group) are determined and used to weight questions based on the user preferences of prior queries.

An additional criterion for determining a candidate question score may be based on semantic similarity, i.e., a measure of the candidate question's closeness to the initial question asked by the user. This may be computed by initiating a standard algorithm(s) that computes a distance measure between two sentences, e.g., computing a lexical and word order similarity. A Neural Network based model could be trained on a corpora of domain specific content to learn the similar entities and concepts. This model is then used to generate vector representations for the existing entities/concepts. The distance between these vector representations are used to identify entities and concepts that are highly relevant.

Based on applying these criteria to the question, a score is determined at 710 and a relevance ranking is determined for that candidate insight question at 715.

In one embodiment, a normalized score "S" for a candidate insight question i may be computed according to weights based on the various criteria:

$$S_i = w_{Surprise\ Factor} + w_{Anomaly\ Detection} + w_{Time\ Series} + w_{User\ Preference} + w_{Semantic\ similarity}$$

where i=1,2, . . . , n and $w_{Surprise\ Factor}$ is the normalized score weight component of question i attributable to the Surprise Factor criteria, $w_{Anomaly\ Detection}$ is the weight component of question i attributable to the application of an Anomaly Detection algorithm, $w_{Time\ Series}$ is the weight component of question i attributable to a Time criteria, $w_{User\ Preference}$ is the weight component of question i attributable to the User Preference criteria, and $w_{Semantic\ similarity}$ is the weight component of question i attributable to its semantic similarity to the original input question.

Then a determination is made at step 720 to determine whether there are any more expanded (insight) questions from module 160. If there are additional questions to be scored, the method returns to step 706, and the next steps 710, 715 are repeated for the next question(s). Finally, at 720, once it is determined that no additional insight questions are to be scored, then, at 725, FIG. 7, the method obtains the highest ranked questions, e.g., a top-K insight (where K is a predetermined limit or number) questions having the highest scores from ranked insights.

Figure 8:
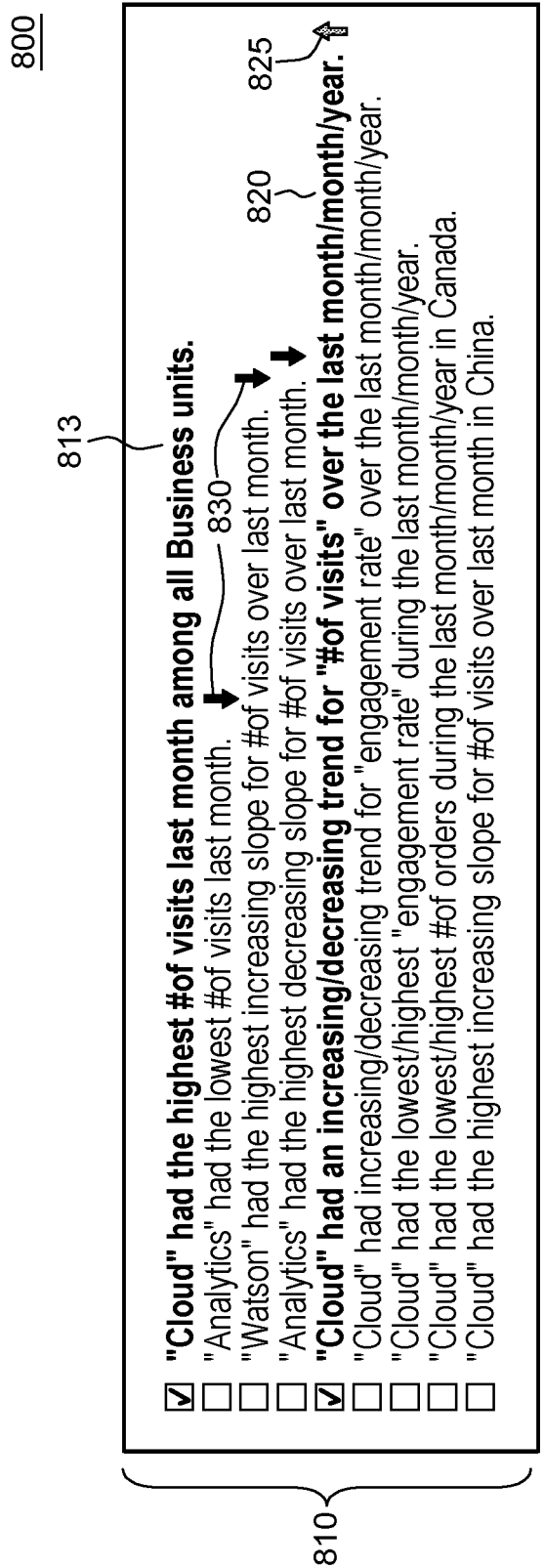
FIG. 8 conceptually depicts the application of ranking/sorting criteria of the multiple candidate insight questions.

FIG. 8 conceptually depicts the application of ranking/sorting criteria 800 of the multiple candidate insight questions. In FIG. 8, there is depicted initial data results 810 obtained from the formed candidate insight questions that are not sorted or ranked. For an example input question "Who had the greatest the number of visits among all business units received last week?", it is seen that the original answer 813 shows that the "cloud" had the highest number of visits received last week. The generation of scores for candidate insight questions reveals that a related question providing data 820 indicating that the "cloud" has an increasing trend for "number of visits" over the last month and year is weighted higher as shown by upward pointing arrow 825 than scores obtained by the data pertaining to other candidate questions as indicated by downward pointing arrows 830. Thus, FIG. 8 illustrates how the score will affect the ranking and the related insight question/data for arrow 825 will be raised higher in the ranking as compared to related insight data for candidate questions having lower scores for arrows 830.

Returning to FIG. 7, once the additional (highest ranked) top-K insight questions are obtained, they may then be input to the module 160 to query the database 150 to form the corresponding SQL queries and obtain the answers to these insight questions. At 750, FIG. 7, the answers to these top-K insight questions are converted to a natural language format and the corresponding insight data is generated for display on the dashboard display of the user interface 201 along with the answer to the user's original input question. As shown in the system diagram of FIG. 1, the original answer "The country with the highest number of visitors is Japan with 123.103 visitors" is displayed, however the top-ranked additional insight data 118 is provided to the user as well, e.g., "visitors from Japan are decreasing compared with the rest of countries in Asia."

FIG. 1 additionally depicts the user's ability to enter feedback 195 as to the value of the additional insight data obtained. For example, the user may enter favorable feedback or indication 196 via the user interface which will indicate that that particular insight question and related insight information provided additional value to the user. Alternatively, the user may enter unfavorable feedback or indication 197 via the user interface which will indicate that that particular insight question and related insight information provided no value to the user. This data may be useful for other users who use the system. For example, this feedback information may be used to change further weighting for the multi-dimensional insight ranking module. Insights which constantly receive unfavorable feedback from users will be penalized as part of Multi-dimensional insight ranking module 170 and ultimately not considered by the question analysis and meaningful insight lookup module 160 as candidate for query expansion. In this context, any known Explore and Exploit techniques (e.g., Thompson Sampling) may be used to make sure fair opportunities to each questions to be showed to enough number of users.

Figure 9A:
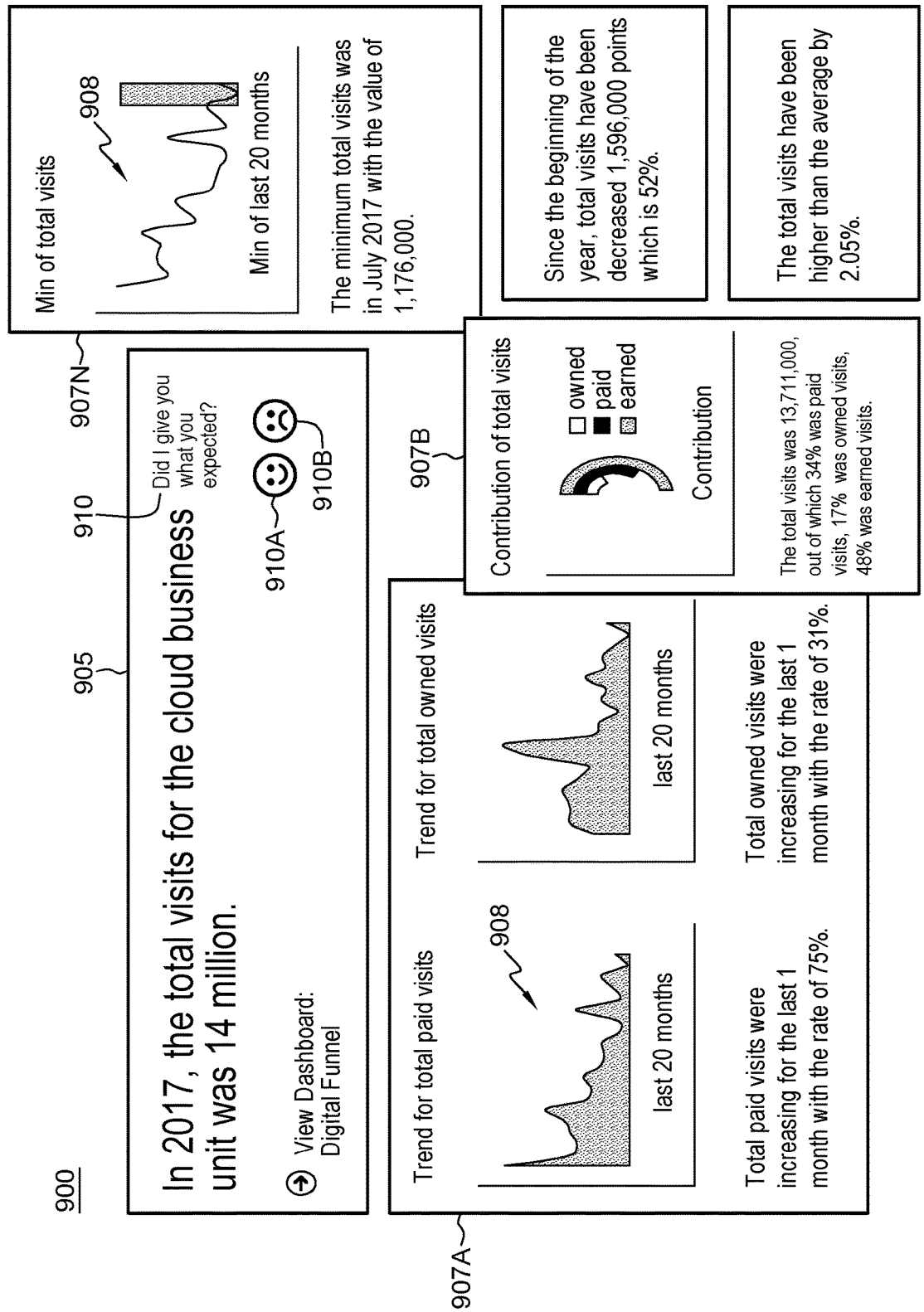
FIGS. 9A and 9B show respective exemplary display interfaces for presenting an original user question/answer and including enhanced display portions providing additional insight data and corresponding graphics.

FIG. 9A shows a first example dashboard display interface 900 user interface (UI) device such a mobile device, e.g., Smartphone or the like. Via the interface 900, there is visually presented the answer(s) 905 to the original input question provided in natural language format, enhanced with additional windows 907A, 907B, . . . , 907N presenting the top-K additional insight data in a natural language format.

The enhanced interface display 900 with additional windows 907A, 907B, . . . , 907N present additional insight data in a graphical format (e.g., table, charts) 908. Using the insight question processing of FIGS. 4-7, a user may thus obtain some insights beyond the scope, yet related, to the original questions input which enables the user to help further understand the data and get insights.

Further, there is generated for presentation to the user dedicated commands for navigating insights (e.g., Like/dislike feedback, scroll to next, share). For example, selectable user feedback commands 910 such as Like 910A and Dislike 910B are provided for user selection to provide feedback to the system. In one embodiment, the commands may be a physical element (e.g., keypad button) of the user device, or a displayed element. In one embodiment, such commands for navigating insights may be rendered on a small screen mounted on the mobile device. In case of a small screen UI, the user can configure what type of interface is displayed on the screen. Users may thus use the UI 900 to access more insights and vote on their relevance via commands 910 without the need for any extra input from the user. The system can learn the user preference from the sequence of questions the user and may recommend facts based on the importance of similar concepts to the asked questions.

Figure 9B:
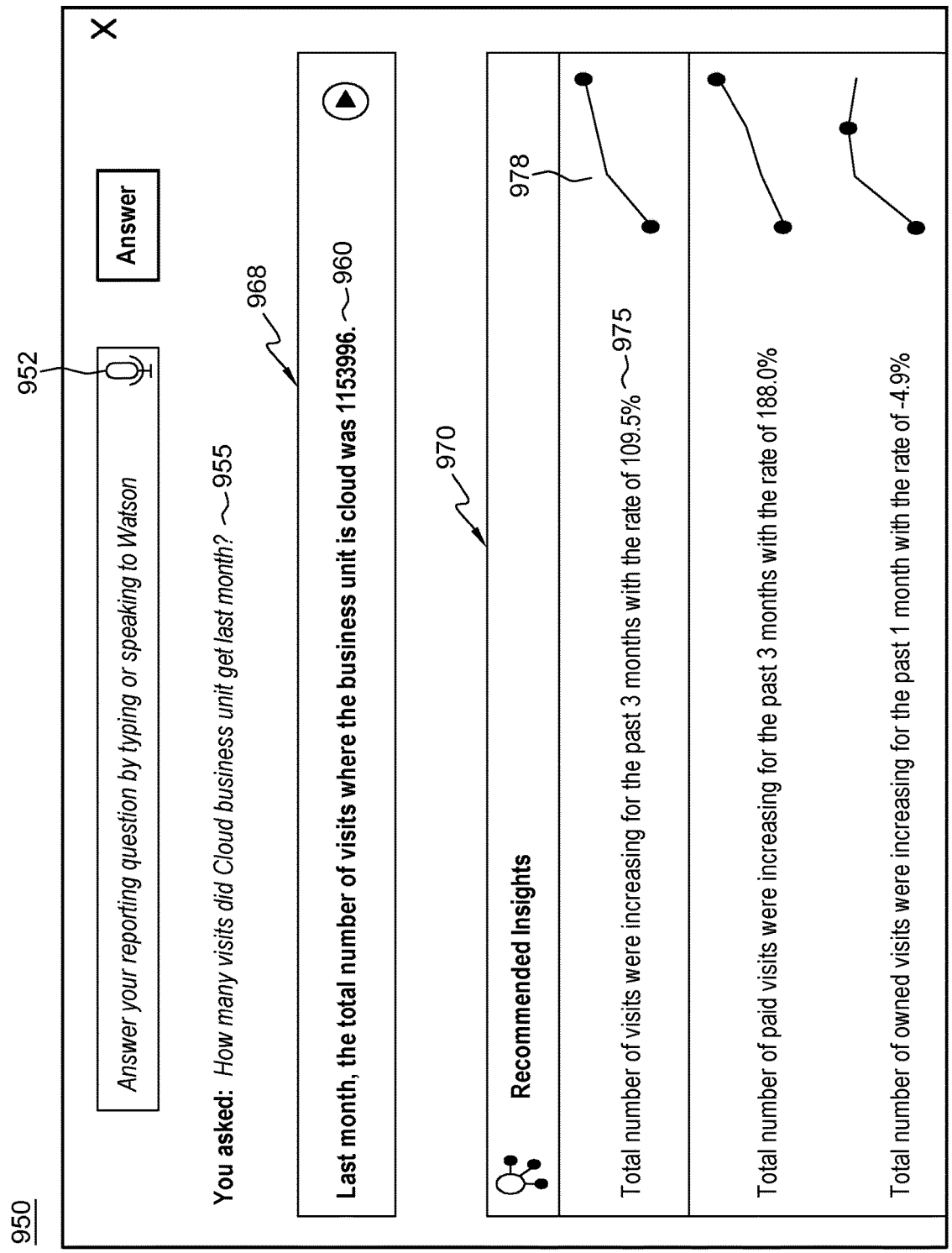

In an alternate embodiment, as shown via an example interface 950 in FIG. 9B, the initial question may be spoken by the user orally, e.g., into a microphone. In this embodiment, the computing device may include a microphone or like audio sensor that is configured for receiving an audible or spoken question upon selecting a microphone indicator 952 via user the interface. In this embodiment, a speech to text conversion step at the computer will be first implemented to convert the spoken question into a digital format suitable for the insight question processing of FIGS. 4-7. In this embodiment, the original input question is converted into displayed textual form 955 and the answer 960 to the initial question and additional insight data 975 are displayed in NL form as well in respective dedicated display fields 968, 970. Additionally generated with the related insight data 975 is a corresponding graphic 978 representative of the insight data. In an embodiment, the answer to the initial question and additional insight data may be converted back in an audible/spoken form for communication over a speaker (not shown) to the user. The user may use his/her voice to interface with the insights data.

In one embodiment, the system of FIG. 1 can be integrated as part of a conversational system (e.g., a bot) to deliver a more complex dialog between the user and the system. In this example, user will be able to ask follow up questions linked to one of the insights returned by the system. e.g., a user receiving the following insights "visitors from Japan are decreasing compared with the rest of countries in Asia." might further ask the system question like "why are my visitor decreasing?" or "which county is registering the higher increase?".

In a further embodiment, as described with respect to FIG. 1, the system is built to interface with a Relational Database. In this context, a NLIDB (Natural Language interface for DB) may be used to convert the questions submitted by the user along with the one generated from the query expansion module 160 in an SQL-like language.

Similarly, in another embodiment, the system is built to interface with data stored into an unstructured data such as knowledge network or accessible via API (Application Programming Interface).

Figure 10:
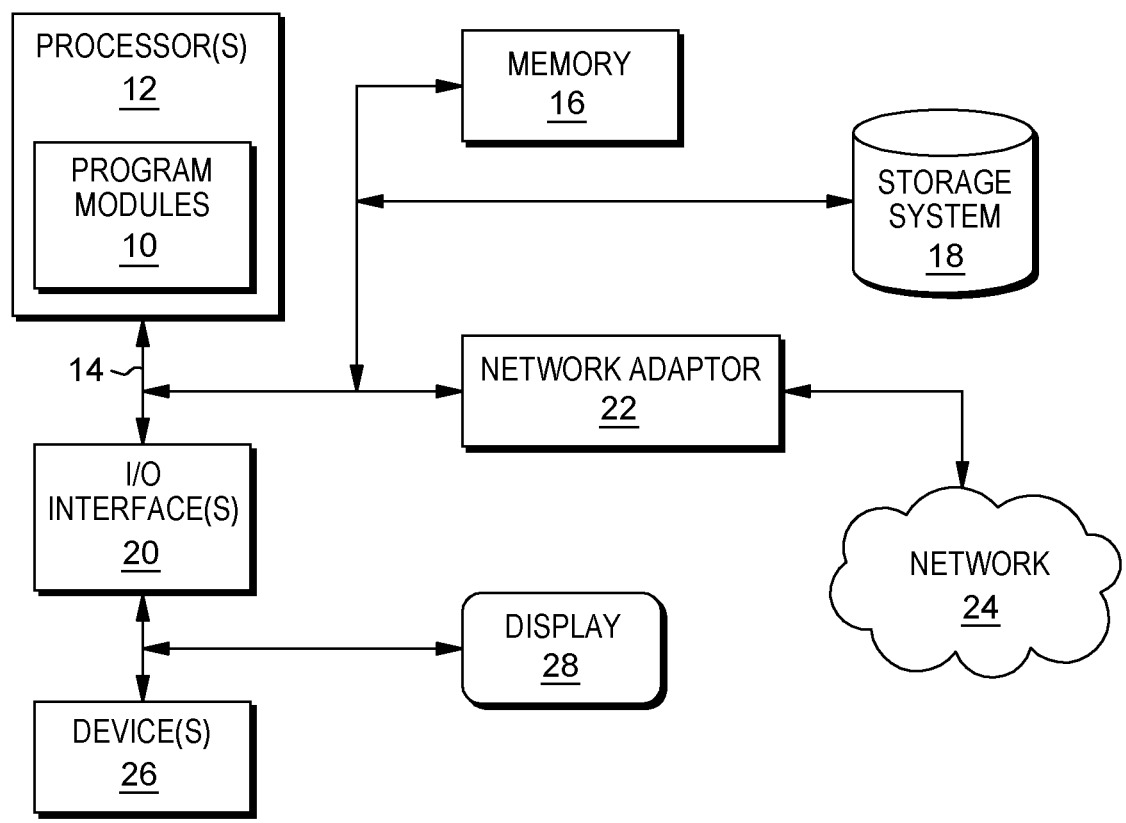
FIG. 10 shows a schematic block diagram of a computer system configured for extracting and presenting personal insights according to embodiment described herein.

FIG. 10 illustrates an example advisory computing system in accordance with the present invention that may provide the services and functions, that given an input a question in natural language format, delivers personalized insights related to the answer. Personalized insights are selected among candidate insights mined from the data and ranked based on closeness to (mined) user-preference, relevance to the question, and surprise factor. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 10 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules may include routines, programs, objects, components, logic, data structures, and so on that perform particular tasks and/or implement particular input data and/or data types in accordance with the methods described in FIGS. 4-7.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory an/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a microphone, a speaker, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for supplementing insights from data in a question/answer system comprising:
   receiving, at a hardware processor, via a user input interface, a question in a natural language (NL) format;
   identifying, using the hardware processor, entities in said received NL question;
   initiating, a query processor to conduct a first search of a data resource to obtain an answer to said received NL question;
   generating, using the hardware processor, multiple candidate expanded questions based on said identified entities and said obtained answer;
   conducting, using the query processor, a second search at the resource to obtain corresponding answers to said multiple candidate questions;
   selecting, using the hardware processor, a sub-set of candidate questions and corresponding answers from among said candidate expanded questions based upon one or more criteria, the selecting a sub-set of candidate questions comprising
      ranking, using the hardware processor, said multiple candidate questions and the corresponding answers based on a user-preference, a relevance to the received NL question, and a surprise factor; and
   presenting to said user, via said user interface, additional personal insight data related to said answer of said received original question based upon said selected sub-set of corresponding answers.

2. The computer-implemented method of claim 1, wherein said identifying said entities in said received NL question comprises:
   conducting, using a natural language processor, a semantic analysis of the received NL question to generate a dependency tree structure relating words of said received question and associated word types, and
   determine said entities based on said relating words and word types.

3. The computer-implemented method of claim 2, wherein said generating the multiple candidate expanded questions comprises:
   applying, using the hardware processor, one or more templates for building said multiple candidate questions for use in discovering additional insights from the data.

4. The computer-implemented method of claim 3, wherein said templates are based on one or more of: a trend in a pre-defined time period, a content-hierarchy, a user preference, a similarity to an identified entity.

5. The computer-implemented method of claim 1, wherein said
   ranking, using the hardware processor, said multiple candidate questions and the corresponding answers is further based on one or more of: a detected anomaly, and a time series.

6. The computer-implemented method of claim 5, wherein said user preference comprises one of: a user job role, one or more historical interactions, a time of the day a type of device used to query the system, and a behavior of a cohort of users.

7. The computer-implemented method of claim 1, conducting, using said hardware processor, a semantic query optimization for efficiently forming queries that limit a number of said multiple candidate expanded questions to obtain said answers.

8. An advisory system comprising:
   a memory storage device; and
   a hardware processor coupled to said memory storage device and configured to perform a method to:
   receive, via a user input interface, a question in a natural language (NL) format;
   identify entities in said received NL question;
   initiate a query processor to conduct a first search of a data resource to obtain an answer to said received NL question;
   generate multiple candidate expanded questions based on said identified entities and said obtained answer;
   conduct, using the query processor, a second search at the resource to obtain corresponding answers to said multiple candidate questions;
   select a sub-set of candidate questions and corresponding answers from among said candidate expanded questions based upon one or more criteria, wherein to select a sub-set of candidate questions, the hardware processor is further configured to:
   rank said multiple candidate questions and the corresponding answers based on a user-preference, a relevance to the received NL question, and a surprise factor; and
   present to said user, via said user interface, additional personal insight data related to said answer of said received original question based upon said selected sub-set of corresponding answers.

9. The advisory system of claim 8, wherein to identify said entities in said received NL question, said hardware processor is further configured to:
   conducting, using a natural language processor, a semantic analysis of the received NL question to generate a dependency tree structure relating words of said received question and associated word types, and
   determine said entities based on said relating words and word types.

10. The advisory system of claim 9, wherein to generate the multiple candidate expanded questions, said hardware processor is further configured to:
    apply one or more templates for building said multiple candidate questions for use in discovering additional insights from the data.

11. The advisory system of claim 10, wherein said templates are based on one or more of: a trend in a pre-defined time period, a content-hierarchy, a user preference, a similarity to an identified entity.

12. The advisory system of claim 8, wherein to select said sub-set of candidate questions and corresponding answers, said hardware processor is further configured to:
    rank said multiple candidate questions and the corresponding answers based further on one or more of: a detected anomaly, and a time series.

13. The advisory system of claim 12, wherein said user preference comprises one of:
    a user job role, one or more historical interactions, a time of the day a type of device used to query the system, and a behavior of a cohort of users.

14. The advisory system of claim 8, wherein said hardware processor is further configured to:
    conduct a semantic query optimization for efficiently forming queries that limit a number of said multiple candidate expanded questions to obtain said answers.

15. A non-transitory computer readable medium comprising instructions that, when executed by at least one processor comprising hardware, configure the at least one processor to:
    receive, via a user input interface, a question in a natural language (NL) format;
    identify entities in said received NL question;
    initiate a query processor to conduct a first search of a data resource to obtain an answer to said received NL question;
    generate multiple candidate expanded questions based on said identified entities and said obtained answer;
    conduct, using the query processor, a second search at the resource to obtain corresponding answers to said multiple candidate questions;
    select a sub-set of candidate questions and corresponding answers from among said candidate expanded questions based upon one or more criteria, wherein to select a sub-set of candidate questions, the at least one processor is further configured to:
    rank said multiple candidate questions and the corresponding answers based on a user-preference, a relevance to the received NL question, and a surprise factor; and
    present to said user, via said user interface, additional personal insight data related to said answer of said received original question based upon said selected sub-set of corresponding answers.

16. The non-transitory computer readable medium according to claim 15, wherein said instructions further comprise instructions to:
    conduct, using a natural language processor, a semantic analysis of the received NL question to generate a dependency tree structure relating words of said received question and associated word types, and determine said entities based on said relating words and word types.

17. The non-transitory computer readable medium according to claim 15, wherein to generate the multiple candidate expanded questions, said instructions further comprise instructions to:
   apply one or more templates for building said multiple candidate questions for use in discovering additional insights from the data, said templates being based on one or more of: a trend in a pre-defined time period, a content-hierarchy, a user preference, a similarity to an identified entity.

18. The non-transitory computer readable medium according to claim 15, wherein to select said sub-set of candidate questions and corresponding answers, said instructions further comprise instructions to:
   rank said multiple candidate questions and the corresponding answers based further on one or more of: a detected anomaly, and a time series.

19. The non-transitory computer readable medium according to claim 18, wherein said user preference comprises one of: a user job role, one or more historical interactions, a time of the day a type of device used to query the system, and a behavior of a cohort of users.

20. The non-transitory computer readable medium according to claim 15, wherein said instructions further comprise instructions to:
   conduct a semantic query optimization for efficiently forming queries that limit a number of said multiple candidate expanded questions to obtain said answers.

* * * * *